United States Patent [19]

Bohl et al.

[11] Patent Number: 4,462,388
[45] Date of Patent: Jul. 31, 1984

[54] FRYING PAN

[75] Inventors: Rainer Bohl, Schondorf; Dorothee Hiller, Stuttgart, both of Fed. Rep. of Germany

[73] Assignee: Fissler GmbH, Idar-Oberstein, Fed. Rep. of Germany

[21] Appl. No.: 385,726

[22] Filed: Jun. 7, 1982

[51] Int. Cl.³ .............................................. A47J 27/00
[52] U.S. Cl. .................................... 126/390; 99/425; D7/357
[58] Field of Search ....................... 126/390, 384, 383; 220/430; D7/357, 364, 354; 99/375, 372, 425, 446, 347, 422

[56] References Cited

U.S. PATENT DOCUMENTS

| | | | |
|---|---|---|---|
| D. 222,730 | 12/1971 | Aries | D7/357 |
| 1,467,272 | 9/1923 | Hazlehurst | 99/425 |
| 1,505,675 | 8/1924 | Stirn | 126/390 X |
| 1,936,551 | 11/1933 | Garrison | 99/425 X |
| 2,579,258 | 12/1951 | Heckert | 99/425 X |
| 2,774,295 | 12/1956 | Watkins | 99/425 |
| 2,849,949 | 9/1958 | Trachtman | 99/425 |

Primary Examiner—Randall L. Green
Attorney, Agent, or Firm—Breneman, Kane & Georges

[57] ABSTRACT

The invention relates to a new-type, easy-to-clean pan of compact, attractive form with divided useful surface, namely a frying surface and a depositing surface, which are distinguished from one another by a temperature gradient.

5 Claims, 31 Drawing Figures

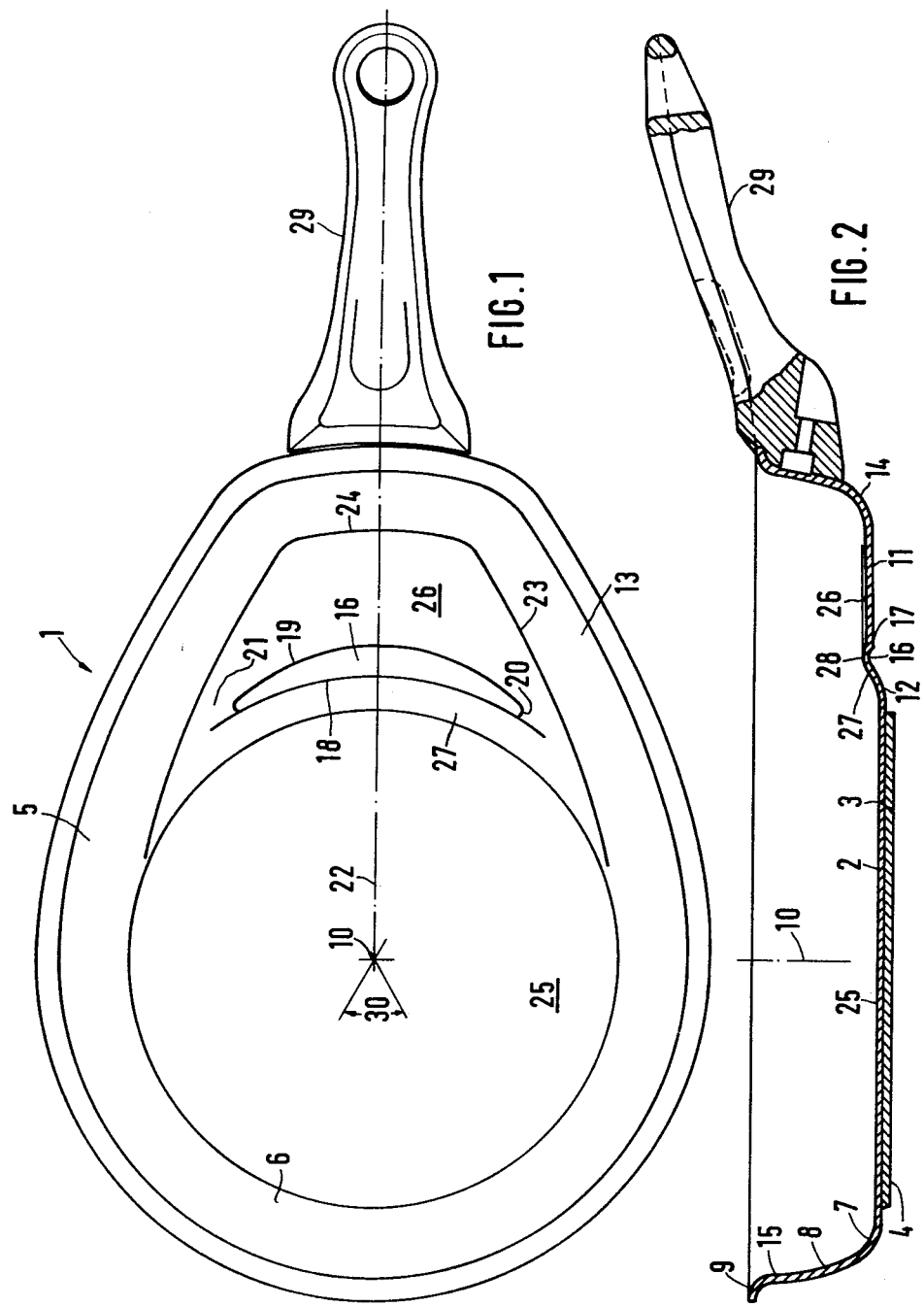

FRYING PAN

The invention relates to a frying pan including a pan body having a pan bottom forming on the under-side a stand surface and on the upper side a frying surface, and a pan border facing upward surrounding the pan bottom, as well as including at least one depositing surface inside the pan border which is raised with respect to the frying surface and lying, in plan view, outside the stand surface, whereby the depositing surface goes over a step into the frying surface.

In one prior art pan disclosed in International Design No. DM/000 080—like the formation of the so-called "water ship" for wood-burning stoves—the lowered middle part forming the frying surface of the pan is surrounded about its entire border by a depositing surface raised with respect to the lowered bottom, which depositing surface, on its part, is bounded by a separate border wall. Thereby, there arises an extremely large radiating surface, so that too much heat is withdrawn from the pan, going up from the zone of the frying surface, Further, there is thus provided a difficult task in the cleaning of the pan and the pan, in consequence of its relatively great structural height, is clumsy and unhandy. It has, furthermore, a comparatively great space requirement.

There is also a prior art frying pan (DE-GbmS No. 74 14 971), in which the pan bottom is subdivided into segments by partitions, so that in one cooking utensil and on one stove flame several dishes can be prepared separately from one another. All the segments are located in the region of the bottom of the pan, which is determined by the fact that on its under-side it forms the stand surface or the contact surface for the heating of the pan on the stove. Thereby there arises the disadvantage that all the segments are uniformly heated in the heating of the pan, and it is hardly possible to expose the food to be cooked to differentiated action of heat. In particular, it is hardly possible to place food in one segment in such a way that it is merely kept warm, but not further subjected to a frying or cooking process. Further, through the subdivision of the pan bottom into segments there is yielded a form of the individual segments which present narrow corners as well as a shape severely diviating from the centrally symmetrical form, which is troublesome for the operations usual in cooking, for example, such as moving the food being cooked, stirring of sauces and the like, and it also makes difficult the cleaning of the pan.

Underlying the invention is the problem of providing a frying pan of the type mentioned which is beautiful overall in form in such a way that its formation is compact, it is smooth-surfaced as possible thereby allowing simple cleaning, it has a differing action of heat on the food being cooked, on the one hand, in the zone of the frying surface, and, on the other hand, in the zone of the depositing surface or depositing surfaces.

This problem is solved in the case of a frying pan of the type mentioned at the outset according to the invention by the means that the step occupies only a part of the circumference of the frying surface and that the depositing surface in its outer width does not exceed the greatest diameter of the adjacent frying surface—as measured in the same direction.

Through the feature that the depositing surface, on the one hand, is raised as well as, on the other hand, being adjacent to the stand surface and thereby to the contact surface for the heating of the pan, this depositing surface of the present invention is less heated in the heating of the pan than the frying surface. Since the depositing surface, through a formation according the step, goes over with its ends into the inside of the outer pan border, and surrounds the frying surface only on a part of its circumference, there is yielded a relatively small-area and space-saving formation of the depositing surface, so that the danger of having a very high heat radiation through the part forming the depositing surface of the altogether compact pan is avoided and, further, there is assured a sufficient heating of the food to be cooked which is laid on the depositing surface. The compact form contributes in particular also to the feature that the depositing surface is to be subject to predetermined restrictions in its outer width.

According to a further feature of the invention, the step occupying only a part of the circumference of the frying surface, between the frying surface and the depositing surfaces, rises flatly to the depositing surface, the depositing surface lying higher than the frying surface by about the thickness of the pan bottom. Thereby, on the one hand, the food to be cooked can be moved back and forth between the frying surface and the depositing surface without high mechanical load and, on the other hand, the critical transition between frying surface and depositing surface can be cleaned easily. Furthermore, there is yielded through the feature of the depositing surface lying higher than the frying surface only by about the thickness of the pan bottom, that a total height of the pan is not greater or only inconsequentially greater than that of a usual pan, whereby the durability of the pan is favorably influenced. The special measure according to which the step surface is to have a thinner wall thickness in comparison to the rest of the pan body, serves the purpose of increasing the temperature gradient between frying surface and depositing surface.

The advantages mentioned continue to be achieved when, between the frying surface and the depositing surface, concave rounding is carried out in their cross sections from the frying surface approximately up to the height of the depositing surface, preferably with a rounding curvature that is approximately equal to that with which the pan border goes over directly into the frying surface. This radius of curvature, in order to achieve an especially flat rise of the step, according to the invention, is approximately as great as half the interior height of the pan or only slightly less, so that in the region of the step, dirt corners are avoided in a simple manner.

An especially advantageous further development of the object of the invention consists in that between the frying surface and the depositing surface, preferably directly on the upper side of the step, there is provided a bulge which stands up over the depositing surface slightly and which thus reaches only over a part of the zone over which the depositing surface borders on the frying surface, in such a way that at least one bulge-free passage is formed. The pan thus formed is suited accordingly especially for the purpose of first pre-frying the frying food on the frying surface, then cooking it further on the depositing surface and, in the meantime, preparing an appertaining sauce or the like on the frying surface, to which over the bulge-free passage, fluid that flows along from the frying food, can be continuously added. The food to be fried does not thereby run the risk of being softened in an uncontrollable manner by fluid on the depositing surface. If, however, when cooking together the food to be fried in fluid or sauce, then it merely has to be laid in the sauce, or be the like prepared on the frying surface or arranged on the depositing surface in such a manner at the bulge-free passage that this passage is blocked so that the fluid cannot flow off from the depositing surface. The bulge can also prevent a slipping off of an auxiliary utensil laid on the depositing surface, such as a cooking spoon or the like, which heats up when placed thereon, but less than if it were placed on the frying surface itself.

Expediently a single continuous bulge is provided, the two ends of which are set back with respect to the lateral end of the step, so that at both ends of the step there is formed in each case a bulge-free passage so that fluid from the depositing surface can flow off especially easily. Also the pan can thereby be easily cleaned in the zone of the transitions of the step into the inside of the pan border.

Both the cleaning of the pan and also the flowing off of fluid from the depositing surface can be still further facilitated if the bulge becomes narrower at its ends, and is crescent-moon shaped preferably in plan view, the convex side of the bulge thus formed lying toward the center of the depositing surface. Thereby passages result which are narrowed in funnel-form toward the frying surface, so that the fluid that flows off from the depositing surfaces passes in exactly determined zones onto the frying surface.

Advantageously, the depositing surface slopes off obliquely to the frying surface at a few degrees of angle, whereby the transfer of the food being cooked from the depositing surface to the frying surface is further facilitated.

According to a further proposal according to the invention the step lies on the broadest side of the depositing surface, whereby there is achieved a very compact basic form of the pan with unrestrictedly easy transferability of the food to be cooked between the various zones.

Preferably the depositing surface decreases in its width between opposing sides of the pan, proceeding, say, from the outside perimeter of the frying surface continuously toward the rear side of the pan. Thereby also the depositing surface lies in the ergonomically favorable zone between frying surface and pan handle. A special flame protection for the grip becomes unnecessary.

The compactness which contributes also to a good durability of the pan is still further improved by the feature that the step occupies, with respect to the mean height axis of the frying surface, an arc angle of less than 180°, in particular of less than 120°.

An especially advantageous further development of the object of the invention consists in that the depositing surface is in plan view approximately trapezoidal and preferably bounded concavely at the step and on the other sides convexly, so that with little projection of the depositing surface with respect to the frying surface, on the one hand, there is yielded a sufficiently large and smooth-surfaced depositing zone and, on the other hand, a broad transition is provided between depositing surface and frying surface. The pan can be approximately oval there in plan view, the depositing surface lying at the especially flattened egg tip.

If the frying pan provides a pan handle for carrying and holding, then according to a further feature of the invention it is provided that the depositing surface lies predominantly on the side of the pan bottom facing and/or lying adjacent the pan handle or the like, and preferably is constructed in plan view symmetrically to the middle plane of the frying surface passing through the handle. Thereby, the frying pan is suited in like manner for use by right-handed and left-handed persons equally well from ergonomic viewpoints.

In order further to improve the smooth surface quality of the inside of the pan, the inside of the pan border outside its zone of bounding of the depositing surface runs steadily upward in its cross section from the frying surface to the upper side of the pan border.

Further, it is favorable to this purpose if the pan border goes over from its step-free zones bordering on the frying surface and maintains its height in circumferential direction constantly into its zone bordering on the depositing surface and preferably, over its entire circumference above the level of the depositing surface, presents constant cross sections.

The easy working with the pan in cooking and the simple cleaning of the pan are still further improved by the means that the pan border in the zone bounding the depositing surface is inclined in its cross sections approximately equally outward as in the zone bounding the the frying surface, in such a manner that the pan border in plan view has about the same width in both zones.

The smooth transition between the different surface zones of the inner surface of the pan is advantageously also to be improved by the means that the section of the pan border surrounding the depositing surface goes over steadily, especially tangentially, into the section surrounding the frying surface.

In an especially compact form of execution of the object of the invention the depositing surface is at most as large in area as half the frying surface, in particular smaller than a quarter of the frying surface, the greatest width of the depositing surface being expediently at most as great as the greatest width of the frying surface, in particular smaller.

The invention is explained in the following with further details with the aid of examples of execution represented in the drawings.

FIG. 1 shows a frying pan according to the invention in plan view;

FIG. 2 shows the frying pan according to FIG. 1 in cross section;

Figure 3A:
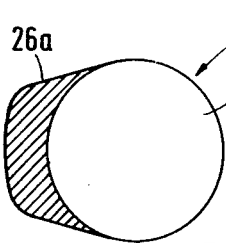

FIGS. 3a and b show two further constructions of a frying pan in simplified plan view;

FIG. 4a to FIG. 22 show further forms of executions of frying pans in representations corresponding to FIG. 3.

As FIGS. 1 and 2 show, a frying pan according to the invention presents a one-piece pan body 1, which, for example, can present constant wall thicknesses over its entire extent and can be constructed of sheet metal deep-drawn or as a casting. The pan body 1 has a circular, substantially flat pan bottom 2, on the underside of which there is fastened a bottom plate 3, which has approximately the same basic form and size as the pan bottom 2. The underside of the bottom plate 3 forms a stand surface 4 of the pan, with respect to which all the other regions and parts of the pan lie elevated. The pan bottom 2 is surrounded by an outer pan border 5, which has in plan view a large basic form deviating with respect to the pan bottom 2. The approximately semicircular section 6 of the pan border 5, as seen in plan view, following in one piece upon the pan bottom 2 goes in cross section according to FIG. 2 over an approximately quarter-circular rounded concave section 7 on the side steadily over into the pan bottom 2, the section 7 reaching nearly to half the height of the pan border 5 and at this height steadily goes over into a section 8 which in cross section according to FIG. 2 is substantially less curved than the section 7, in such a way that the pan border 5 is here inclined slightly obliquely outward. The section 8 goes upward in cross section according to FIG. 2 steadily over into an approximately quarter-circular edge fold 9, which forms the outward directed border edge of the pan border 5. The radius of curvature of section 9 is considerably less than that of the section 7. The section 6 of the pan border 5 lies coaxially to the middle height axis 10 of the pan bottom 2.

Adjacent to the pan bottom 2 forming the under-side of the stand surface 4, this pan bottom 2 presents on one side a freely projecting continuation 11, which goes over a step 12 into the pan bottom 2 and with respect to the pan bottom 2 lies raised by about the total thickness of the pan bottom 2 inclusive of the bottom plate 3.

The continuation 11 lies likewise within the pan border 5 and, namely, inside a section 13, which—in plan view—goes over on both sides steadily, respectively tangentially, into the section 6. The section 13 goes over into the approximately level continuation 11 of the pan bottom 2—like the section 6 in the pan bottom itself—in cross section according to FIG. 2 steadily over an approximately quarter-circularly rounded section 14, the radius of curvature of which is approximately equal or only slightly less than that of the section 7. Above the level of this section 14 the section 13 of pan border 5 surrounding the continuation 11 is constructed in cross section substantially like section 6. Through the formation described the inner surface 15 of the pan border 5 is smooth-surfaced throughout over its entire circumference as well as over its entire height and free of any steps or similar offset transitions.

The step 12 between the pan bottom 2 and the continuation 11 rises uniformly in cross section according to FIG. 2 from the pan bottom 2 to the continuation 11, it being curved in cross section substantially like section 7 and going over steadily into the pan bottom 2. The arc angle over which the cross section curvature of step 12 extends is, however, substantially less than 90°. About at the height of the level of the continuation of the continuation 11 the step 12 goes over in cross section steadily into a corrugation-form bulge 16, which stands out by less than the thickness of the continuation 11 over its upper side and, on its part is curved convexly in cross section on the upper side. The bulge 16 goes over a curved flank section 17 of partial circular form in cross section over into the continuation 11, the concavely curved upper side of this flank section 17 connecting both steadily onto the upper side of the continuation 11 as well as onto the convexly curved upper side of the bulge 16. In plan view according to FIG. 1 the bulge 16 is curved about the mean height axis 10 of the pan bottom 2, in which its flank facing the pan bottom 2 lies coaxial to the mean height axis, while its other flank 19 formed by the flank section 17 presents a smaller radius of curvature, so that there is yielded a crescent-moon shaped basic form of the bulge 16.

The ends 20 of the bulge 16 surrounding the pan bottom 2 at a constant spacing does not extend to the pan border 5, but are set back somewhat from this in each case, so that there are formed bulge-free passages 21 between the continuation 11 and the pan bottom 2.

Both the continuation 11 and also the section 13 of the pan border 5 surrounding this, the step 12 and the bulge 16 are formed in plan view according to FIG. 1 symmetrically to an axial plane 22 of the pan bottom 2. The step 12 concavely curved to the middle height axis 10 of the pan bottom 2 like the bulge 16 lies on the widest side of the continuation 11, which becomes narrower with increasing distance from the pan bottom 2. In the example of execution represented, the continuation 11 in plan view according to FIG. 1 is approximately trapezoidal, its side boundaries 23 and its boundary 24 lying opposite the step 12 in each case being curved slightly outward. In the zone of the boundary 24 the continuation 11 there is about half as wide as in the region of the step 12. The side boundaries 23 and the boundary 24 go over roundedly into one another, also in the zone of these transitions the cross sections of the pan border 5 being substantially the same as in the other zones. Through the formation described the pan has an approximately oval basic form with a flattened tip like an egg.

The upper side of the pan bottom 2 forms the frying surface 25 of the pan, which lies in coverage to the stand surface 4. The continuation 11 forms a depositing surface 26 for the cooking material raised with respect to the frying surface 25, which is only about a quarter as large as the frying surface 25. The frying surface 25 goes over the flatly rising upper step surface 27 and the step upper side 28 curved convexly in cross section into the depositing surface 26. Over the step surface 27 the food to be cooked can be easily slid from the frying surface 25 onto the depositing surface 26, from which, in turn, the food can just as smoothly be transferred along the inside of the pan border 5 in the zone of the passages 21 to the frying surface 25.

At the narrow end of the elongated pan body 1 deviating from the circular form there is fastened to the outside of the pan border 5 a pan handle 29, the longitudinal middle plane of which coincides with the axial plane 22 and which lies on the side of the depositing surface 26 away from the frying surface 25. Instead of a pan handle it is also conceivable to use as handle one or more lugs on the outside of the pan body 1. As FIG. 1 further shows, the step surface 27—with respect to the middle height axis 10 of the frying surface 25—occupies an arc angle 30 of less than 90°.

In FIGS. 3a to 22 there are used for parts corresponding to one another the same reference numbers as in FIGS. 1 and 2 but with the addition of letter indices.

Figure 3B:
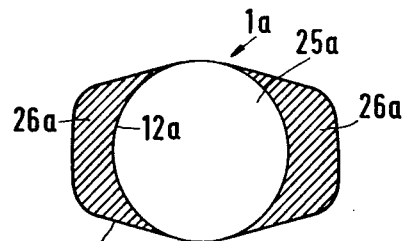

In the frying pan according to FIGS. 3a and 3b the pan body 1a presents on one or two oppositely lying sides depositing surfaces 26a, between which there is provided the frying surface 25a. For each depositing surface 26a there is provided a separate step 12a for the frying surface 25a. Each depositing surface 26a is constructed in itself approximately like the depositing surface 26 according to FIGS. 1 and 2, the depositing surfaces 26a, however, being formed wider.

Figure 4B:
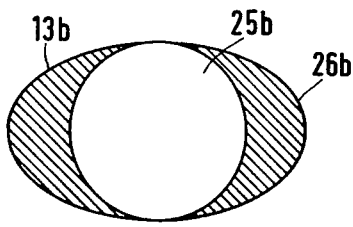
Figure 4A:
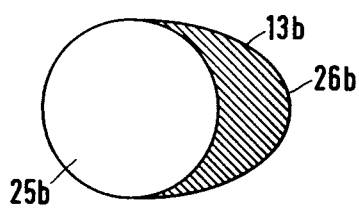

In the form of execution according to FIGS. 4a and 4b the depositing surface or surfaces 26b are bounded partial-elliptically in such a way that the appertaining section 13b of the pan border has in plan view in each case the contour of a half-ellipse, while the frying surface 25b is circular.

Figure 5:
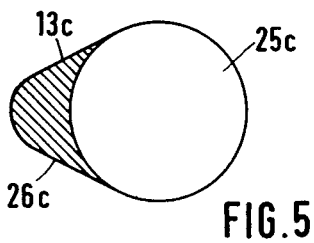

The depositing surface 26c according to FIG. 5 is bounded in partial-circle form on its end facing away from the frying surface 25c, in such a way that the appertaining section 13c of the pan border is constructed in plan view V-shaped with rounded point.

Figure 6:
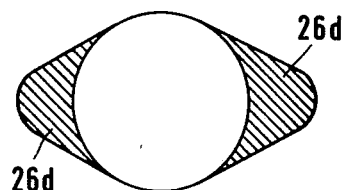
Figure 7:
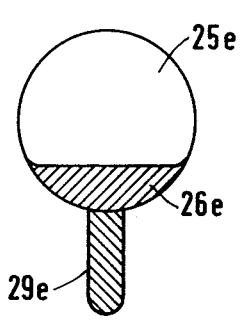
Figure 8:
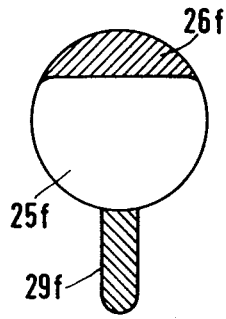

In the frying pan according to FIG. 6 there are provided two equal depositing surfaces 26d lying opposite one another according to FIG. 5.

In the forms previously described the frying surfaces is substantially round.

In contradistinction to the forms so far described of the pan of the invention, the pans according to FIGS. 7 to 12 have in plan view a circular basic form, i.e., in these pans the pan border as seen in plan view is constructed circular or circular-annular. The depositing surfaces are in plan view in each case circular-section-shaped and substantially smaller than half the circle area. In the form of execution according to FIG. 7 the depositing surface 26e lies on the side of the frying surface 25e facing the pan handle 29e. In the form of execution according to FIG. 8 the depositing surface 26f, in contrast, is provided on the side of the frying surface 25f facing away from the pan handle 29f.

Figure 9:
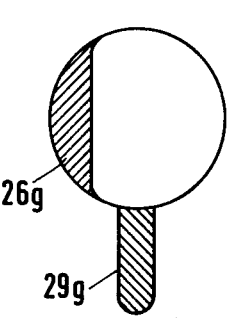
Figure 10A:
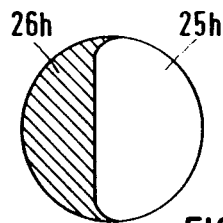
Figure 10B:
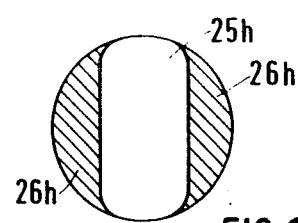
Figure 11:
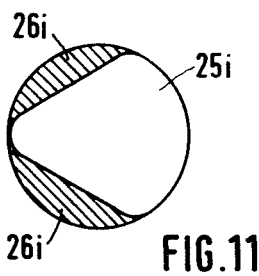
Figure 12:
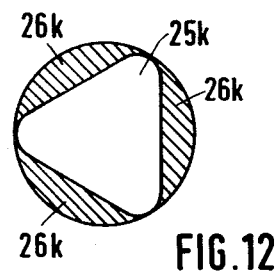

It is also thinkable, however, to provide the depositing surface 26g according to FIG. 9 to one side of the pan handle 29g, for example, in such a way that it is constructed symmetrical to the axial plane of the pan body which lies at a right angle to the axial plane passing through the pan handle 29g. According to FIG. 10a, on one side of the frying surface 25h there is provided a depositing surface 26h. According to FIG. 10b two depositing surfaces 26h are provided, the two depositing surfaces 26h lying opposite one another on both sides of the frying surface 25h. As FIG. 11 shows, there can also be provided two depositing surfaces 26i at an angle to one another in such a way that the frying surface 25i has an acute form in plan. If according to FIG. 12 three depositing surfaces 26k are distributed, for example uniformly over the circumference of the pan body about the frying surface 25k, then the frying surface 25k with circular basic form of the pan body presents an equilatral triangular basic form.

Figure 13A:
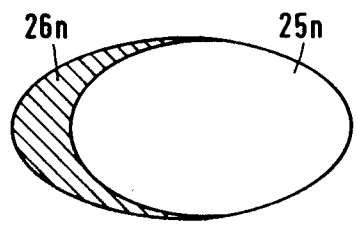
Figure 13B:
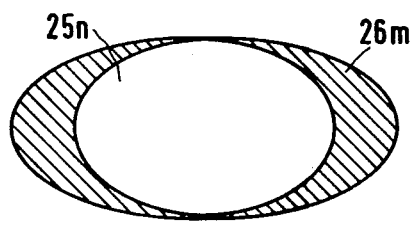
Figure 14A:
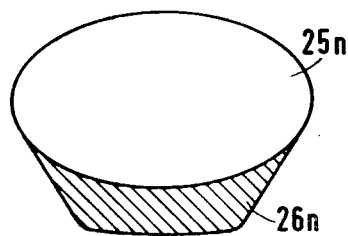
Figure 14B:
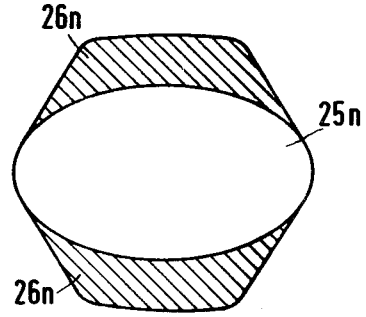

The form of execution according to FIGS. 13a and 13b differs from those according to FIGS. 4a and 4b in that the frying surface 25n itself presents an oval or elliptical base surface; the depositing surface 26n or surfaces 26m are, constructed as in the form of execution according to FIGS. 4a and 4b and provided symmetrically to the axial plane of the frying surface 25n coinciding with the longer ellipse axis. In the form of execution according to FIGS. 14a and 14b the depositing surface or depositing surfaces 26n are provided symmetrical to the shorter axis of the ellipse of the frying surface 25n and as in the form of execution according to FIGS. 3a and 3b constructed approximately trapezoidal.

Figure 15A:
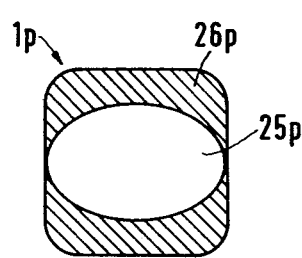

According to FIG. 15a the frying surface 25p is elliptical and the base form of the pan body 1p is rectangular or square.

Figure 15B:
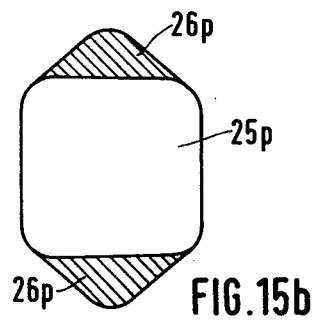

As FIG. 15b shows, the frying surface 25p can also present a rectangular or square base form, in which the depositing surface 26p and the depositing surfaces 26p are expediently arranged symmetrical to the middle of the appertaining outer edge in each case of the frying surface 25p.

In the forms of execution according to FIGS. 16 to 19 the entire pan body in each case presents rectangular or square base form. The depositing surface 26q according to FIG. 16 has the form of a corner section of this square base form. According to FIG. 17 there are provided two corner-section-shape depositing surfaces 26r lying diagonally opposite one another.

Figure 17:
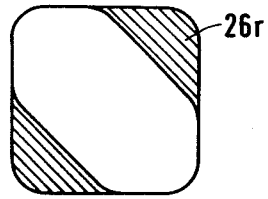
Figure 16:
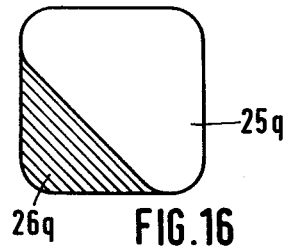
Figure 18B:
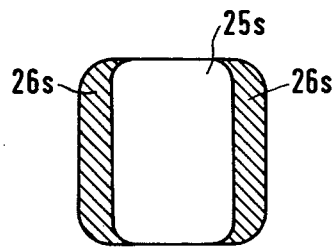
Figure 18A:
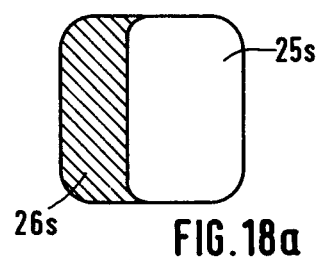
Figure 19B:
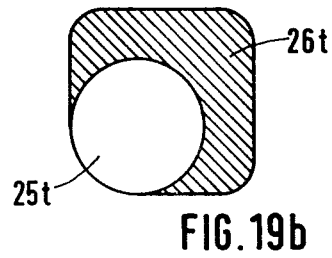
Figure 19A:
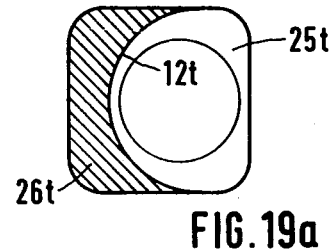
Figure 20A:
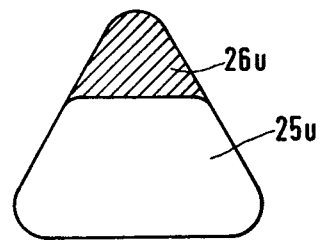
Figure 20B:
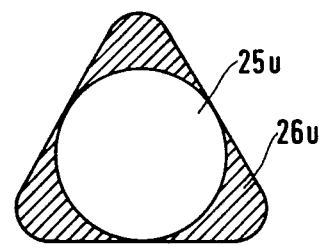
Figure 21:
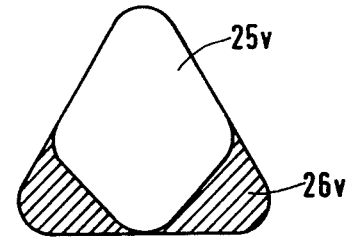

The depositing surfaces 26p, 26q, 26r according to FIGS. 15 to 17 thereby have triangular base form. In the form of execution according to FIGS. 18a and 18b the depositing surface or depositing surfaces 26s are strip-shaped, lying parallel to an outer edge of the pan body. The situation is similar in the case of the depositing surface 26t according to FIG. 19a, in which, however the step 12t is curved in plan view in circular segment form as in the case of the form of execution according to FIGS. 1 and 2. FIG. 19b shows a rectangular base form of the pan body with off-center frying surface 25t.

Figure 22:
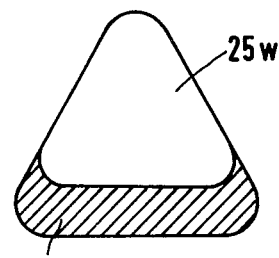

The pan bodies according to FIGS. 20a to 22 have in plan view triangular base form, preferably equilateral triangular base form. According to FIG. 20a one corner of this triangle is constructed as a raised depositing surface 26u, so that there is yielded a trapezoidal frying surface 25u. According to FIG. 20b depositing surfaces 26u are provided at all three corners, which enclose a round frying surface 25u, in each case partially. In the form of execution according to FIG. 21, two corners of the pan body are constructed as raised depositing surfaces 26v, in such a way that there results an approximately rhombic frying surface 25v. As FIG. 22 shows, the raised depositing surface 26w can also be provided in strip form along an outer edge of the triangular base form of the pan body, so that the frying surface 25w is likewise approximately equilateral.

What is claimed is:

1. A frying pan comprising:
   an upward-facing pan border surrounding a pan bottom to define a pan body;
   said pan bottom including an upper side to provide a frying surface, and a bottom side to provide a stand surface;
   at least one depositing surface disposed inside said pan border adjacent to said pan border, said one depositing surface having a smaller surface area than said frying surface;
   said one depositing surface being raised with respect to said frying surface and being spaced, in plan view, outside of said stand surface;
   said one depositing surface being inclined downwardly a few angular degrees towards said pan bottom;
   connecting means disposed between a peripheral portion of said frying surface and an adjacent peripheral portion of said one depositing surface so that food to be fried can pass from said one depositing surface over said connecting means onto said frying surface and back again over said connecting means onto said one depositing surface, said connecting means including a step;
   said step being provided with a longitudinally extending bulge thereon, said bulge being slightly raised above said one depositing surface, said step being longitudinally longer than said bulge to provide at least one bulge-free passage from said one depositing surface over said step to said frying surface;
   said one depositing surface continuously decreasing in width as it extends from said connecting means as measured between opposite sides of said pan border; and
   said one depositing surface being supported by and in juxtaposition with a portion of said pan bottom which is raised with respect to said stand surface.

2. A frying pan according to claim 1, wherein said one depositing surface, in plan view, is approximately trapezoidal in configuration, said portion of said depositing surface adjacent said connecting means being concave with opposing sides of said one depositing surface being convex.

3. A frying pan according to claims 1 or 2, wherein said passage is constricted to provide a funnel-type arrangement towards said frying surface.

4. A frying pan according to claims 1 or 2, wherein said bulge is continuous with opposite ends thereof being spaced inwardly from opposite ends of said step to provide two spaced apart bulge-free passages disposed at said opposite ends of said step.

5. A frying pan according to claim 4, wherein said bulge tapers inwardly from a center portion thereof towards both said opposite ends thereof to provide a crescent-moon configuration.

* * * * *